United States Patent
Lee et al.

(10) Patent No.: US 9,407,114 B2
(45) Date of Patent: Aug. 2, 2016

(54) NETWORK SYSTEM AND CONTROL METHOD THEREOF

(75) Inventors: Chulwoo Lee, Changwon-si (KR);
Sangryul Lee, Changwon-si (KR);
Joongki Min, Changwon-si (KR);
Kwangsuk Oh, Changwon-si (KR);
Sanghyuk Hong, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 920 days.

(21) Appl. No.: 13/473,225

(22) Filed: May 16, 2012

(65) Prior Publication Data

US 2012/0292997 A1 Nov. 22, 2012

(30) Foreign Application Priority Data

May 16, 2011 (KR) .................. 10-2011-0045815

(51) Int. Cl.
*H02J 13/00* (2006.01)
*G06Q 50/06* (2012.01)

(52) U.S. Cl.
CPC .............. *H02J 13/001* (2013.01); *G06Q 50/06* (2013.01); *Y02E 40/76* (2013.01); *Y04S 10/40* (2013.01); *Y04S 10/545* (2013.01); *Y10T 307/469* (2015.04)

(58) Field of Classification Search
USPC ........................................................ 307/134
See application file for complete search history.

(56) References Cited

U.S. PATENT DOCUMENTS

| | | | | |
|---|---|---|---|---|
| 7,747,739 B2 * | 6/2010 | Bridges | ..................... | B60L 3/12 307/80 |
| 2007/0262653 A1 * | 11/2007 | Ryan | ..................... | G06F 11/004 307/134 |
| 2008/0040479 A1 * | 2/2008 | Bridge | ..................... | B60L 3/12 709/224 |
| 2009/0326725 A1 * | 12/2009 | Carlson | ................. | G06F 1/3203 700/291 |
| 2010/0250590 A1 * | 9/2010 | Galvin | ................. | G06F 1/3203 707/770 |
| 2011/0046792 A1 * | 2/2011 | Imes | ................... | F24F 11/0086 700/278 |
| 2011/0049984 A1 * | 3/2011 | Son | .......................... | H02J 3/14 307/31 |
| 2011/0082599 A1 * | 4/2011 | Shinde | ................ | H02J 13/0003 700/295 |
| 2011/0098869 A1 * | 4/2011 | Seo | ......................... | G01D 4/004 700/296 |
| 2011/0106321 A1 * | 5/2011 | Cherian | .................... | H02J 3/00 700/286 |
| 2011/0106328 A1 * | 5/2011 | Zhou | ..................... | G05B 13/024 700/291 |

* cited by examiner

*Primary Examiner* — Thienvu Tran
*Assistant Examiner* — David M Stables
(74) *Attorney, Agent, or Firm* — Dentons US LLP

(57) ABSTRACT

Provided are a network system and a method of controlling the network system supplied with energy from an energy generation component. The network system includes an energy consumption component consuming the energy generated from the energy generation component, and driving a driving component for processing or managing a consumable. The energy consumption component is provided with one or more courses classified according to a determination factor related to the consumable. The determination factor includes a performance factor denoting a processed or managed result of the consumable. One of the courses is recommended as a driving course when the energy consumption component recognizes information about the consumable.

11 Claims, 8 Drawing Sheets

Fig. 7

| | Cooking time | Cooking performance | 1st cost (floating payment system) | 2nd cost (fixed payment system) | Power consumption |
|---|---|---|---|---|---|
| 1st course | 30minutes | B+ | 900wons | 750wons | 2Kwh |
| 2nd course | 40minutes | A- | 1,100wons | 930wons | 3Kwh |
| 3rd course | 50minutes | A- | 1,500wons | 1,300wons | 4.5Kwh |
| 4th course | 60minutes | A+ | 1,800wons | 1,550wons | 5.5Kwh |

|  | Cooking time | Recommended start time | Saved cost |
|---|---|---|---|
| 1st course | 30wons | 13:00 | 100wons |
| 2nd course | 40wons | 12:45 | 150wons |
| 3rd course | 50wons | 12:30 | 200wons |
| 4th course | 60wons | 12:20 | 250wons |

130

NETWORK SYSTEM AND CONTROL METHOD THEREOF

CROSS-REFERENCE TO RELATED APPLICATIONS

The present application claims priority under 35 U.S.C. 119 and 35 U.S.C. 365 to Korean Patent Application No. 10-2011-0045815 filed on May 16, 2011, which is hereby incorporated by reference in its entirety.

BACKGROUND

The present disclosure relates to a network system and a method of controlling the network system.

Providers simply provide an energy source such as electricity, water or gas, and customers simply use the energy source provided from the providers. As a result, it is difficult to perform effective management in view of energy production, energy distribution, energy usage, or the like. Therefore, it is required to develop a network system for effectively managing energy.

SUMMARY

Embodiments provide a network system and a method of controlling the network system capable of effectively managing an energy source.

In one embodiment, a network system supplied with energy from an energy generation component includes an energy consumption component consuming the energy generated from the energy generation component, and driving a driving component for processing or managing a consumable, wherein the energy consumption component is provided with one or more courses classified according to a determination factor related to the consumable, the determination factor includes a performance factor denoting a processed or managed result of the consumable, and one of the courses is recommended as a driving course when the energy consumption component recognizes information about the consumable.

In another embodiment, a method of controlling a network system includes: recognizing information about a consumable that is managed or processed by an electric appliance; inputting a first mode of an operation mode of the electric appliance; displaying driving information according to one or more courses provided to the electric appliance; selecting one of the courses; and driving a driving component of the electric appliance in the selected course.

The details of one or more embodiments are set forth in the accompanying drawings and the description below. Other features will be apparent from the description and drawings, and from the claims.

BRIEF DESCRIPTION OF THE DRAWINGS

FIG. 7 is a view illustrating a display component of an electric appliance according to a first embodiment.

FIG. 8 is a view illustrating a display component of an electric appliance according to a second embodiment.

DETAILED DESCRIPTION OF THE EMBODIMENTS

Reference will now be made in detail to embodiments of the present disclosure, examples of which are illustrated in the accompanying drawings.

Figure 1:
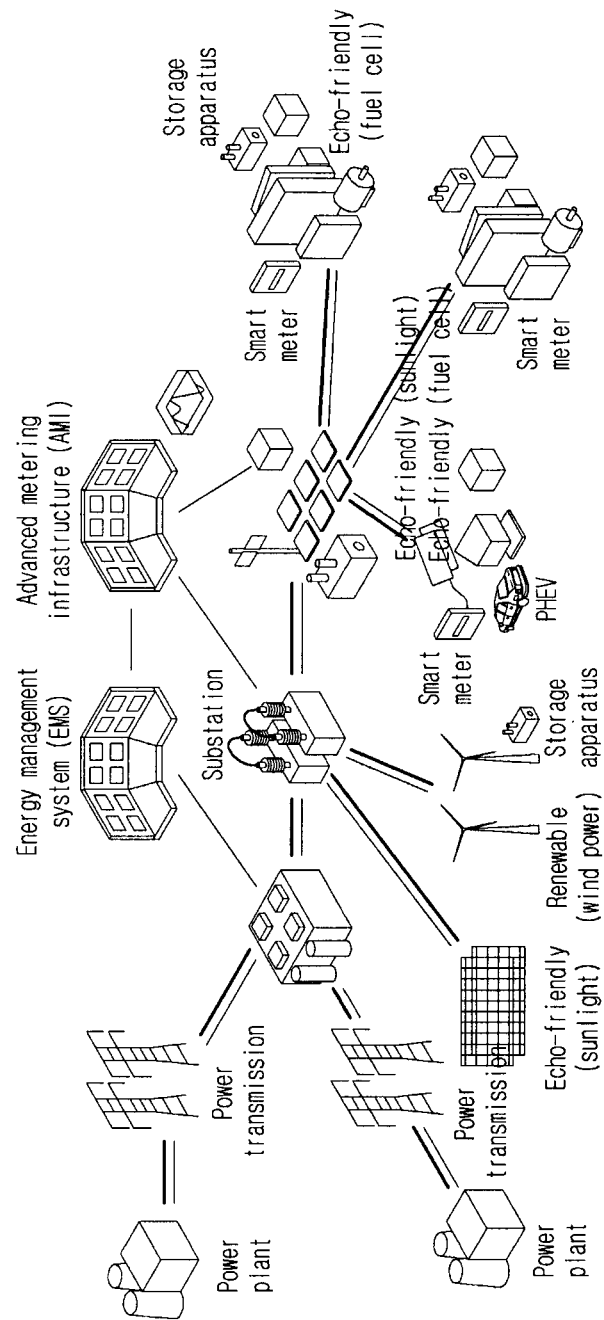
FIG. 1 is a schematic view illustrating a network system according to an embodiment.

FIG. 1 is a schematic view illustrating a network system according to an embodiment.

A network system according to the current embodiment is used to manage an energy source such as electricity, water or gas. A generated or used amount of the energy source can be metered. Therefore, even a source not mentioned above may be used as the energy source. Hereinafter, electricity will be described as an example of the energy source, and details of this specification may be identically applied to other energy sources.

Referring to FIG. 1, a network system according to an embodiment includes a power plant for producing electricity. The power plant may include a power plant for producing electricity through a thermal power generation or nuclear power generation and a power plant using water power, sunlight power, wind power or the like which is eco-friendly energy.

The electricity produced in the power plant is transmitted to a sub-control center through a power transmission line, and the sub-control center transmits the electricity to a substation so that the electricity is distributed to customers such as houses or offices. Electricity produced by the eco-friendly energy is also transmitted to the substation so as to be distributed to each of the customers. The electricity transmitted from the substation is distributed to each of the offices or houses through electricity power storage, or is directly distributed to each of the offices or houses.

In a house using a home area network (HAN), electricity may be produced by itself through sunlight, fuel cells built in a plug-in hybrid electric vehicle (PHEV), or the like. Also, the produced electricity may be stored or distributed, or surplus electricity may be resold to the outside world.

The network system may include a smart meter for detecting the amount of electricity used in each customer (house, office or the like) in real time, and an advanced metering infrastructure (AMI) for metering the amount of electricity used in a plurality of customers.

The network system may further include an energy management system (EMS) for managing energy. The EMS may generate information on operations of one or more components with respect to energy (production of energy, distribution of energy, usage of energy, storage of energy, and the like). The EMS may generate at least a command for the operations of the components. In this specification, a function or solution performed by the EMS may be referred to as an energy management function or energy management solution.

In the network system, one or more EMSs may be provided as a separate configuration, or the EMS may be included as an energy management function or energy management solution in one or more components.

Figure 2:
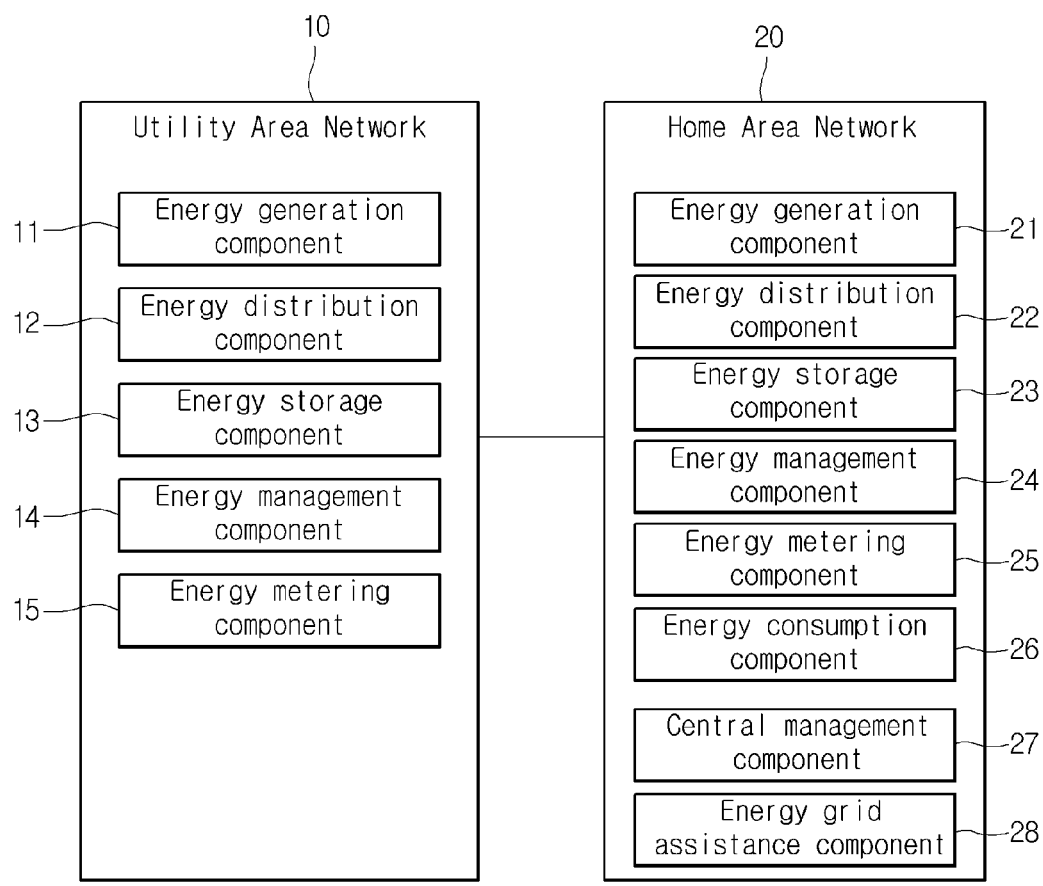
FIG. 2 is a block diagram illustrating the network system of FIG. 1.

FIG. 2 is a block diagram illustrating the network system of FIG. 1.

Referring to FIGS. 1 and 2, the network system according to the current embodiment is configured by a plurality of components. For example, the components of the network system are a power plant, a substation, a sub-control center, an EMS, electric home appliances, a smart meter, a storage battery, a web server, an AMI, a home server, and the like.

In the current embodiment, each of the components may be configured by a plurality of sub-components. As an example, in a case of one component is an electric home appliance, sub-components may be a microcomputer (MICOM), a heater, a display and the like. That is, all that perform a specific function may be components in the current embodiment, and such components constitute the network system of the current embodiment. Two components may communicate with each other by means of a communication unit. One network may be one component or may be configured by a plurality of components.

In this specification, the network system in which communication information is related to an energy source may be preferred to as an energy grid.

A network system according to an embodiment may include a utility area network (UAN) 10 and a home area network (HAN) 20. The UAN 10 and the HAN 20 may perform wired or wireless communication by means of a communication unit, and may perform two-way communication. In this specification, the term "home" means not only a household as a lexical meaning but also a group in which specific components such as buildings or companies gather. Also, the term "utility" means a group in which specific components outside the home gather.

The UAN 10 includes an energy generation component 11 for generating energy, an energy distribution component 12 for distributing or transmitting energy, an energy storage component 13 for storing energy, an energy management component 14 for managing energy, and an energy metering component 15 for metering information related to energy.

In a case where one or more components that constitute the UAN 10 consume energy, the components that consume the energy may be energy consumption components. The energy consumption component is a component corresponding to the energy consumption component 26 that constitutes the HAN 20. The energy consumption component may be the same component as the energy consumption component 26 or may be another component distinguished from the energy consumption component 26.

The energy generation component 11 may be a power plant as an example. The energy distribution component 12 distributes or transmits energy generated in the energy generation component 11 and/or energy stored in the energy storage component 13 to the energy consumption component 26 that consumes the energy. The energy distribution component 12 may be a power transmitter, substation, sub-control center, or the like.

The energy storage component 13 may be a storage battery, and the energy management component 14 generates information for driving one or more of the energy generation component 11, the energy distribution component 12, the energy storage component 13 and the energy consumption component 26, related to energy. The energy management component 14 may generate at least a command for the operation of a specific component.

The energy management component 14 may be an EMS. The energy metering component 15 may meter information related to the generation of energy, the distribution of energy, the usage of energy, the storage of energy, and the like. The energy metering component 15 may be an AMI as an example. The energy management component 14 may be a separate configuration, or may be included in another component as an energy management function.

The UAN 10 may communicate with the HAN 20 by a terminal component (not shown). That is, information generated or transferred in a specific component that constitutes the UAN 10 may be transmitted to the HAN 20 through the terminal component, or information generated or transferred in another component that constitutes the HAN 20 may be received to the UAN 10 through the terminal component. The terminal component may be a gate way as an example. The terminal component may be provided to one or more of the UAN 10 and the HAN 20.

The terminal component may be a component necessary for transmitting/receiving information between the UAN and the HAN. Two components that constitute the UAN 10 may communicate with each other by means of a communication unit.

The HAN 20 includes an energy generation component 21 for generating energy, an energy distribution component 22 for distributing energy, an energy storage component 23 for storing energy, an energy management component 24 for managing energy, an energy metering component 25 for metering information related to energy, an energy consumption component 26 for consuming energy, a central management component 27 for controlling a plurality of components, and an energy grid assistance component 28.

The energy generation component 21 may be a home power generator, and the energy storage component 23 may be a storage battery. The energy management component 24 may be an EMS, and the energy metering component 25 may meter information related to the generation of energy, the distribution of energy, the usage of energy, the storage of energy, and the like. The energy metering component 25 may be a smart meter as an example. The energy consumption component 26 may be, as an example, an electric home appliance or a heater, motor, display or the like, which constitutes the electric home appliance. In this embodiment, there is no limitation in the kind of the energy consumption component 26.

Specifically, the energy generation component 21 may be another component of the UAN 10, which generates energy to be supplied to the HAN 20.

The energy management component 24 may be provided as a separate configuration or may be included in another component as an energy management function. Specifically, the energy management component 14 that constitutes the UAN 10 or the energy management component 24 that constitutes the HAN 20 may be built in one or more of the plurality of components that constitute the networks 10 and 20, or may exist as a separate device. The energy management component 24 may recognize the information related to energy (energy information) and the state information of a component controlled by the energy management component 24.

The energy generation component 21, the energy distribution component 22 and the energy storage component 23 may be individual components, or may constitute a single component. The central management component 27 may be, as an example, a home server for controlling a plurality of electric home appliances. The energy grid assistance component 28 is a component having a primary function while performing an additional function for the energy grid. For example, the energy grid assistance component 28 may be a web service providing component (e.g., a computer or the like), mobile device, television, or the like. Two components that constitute the HAN 20 may communicate with each other by means of a communication unit.

The energy generation components 11 and 21, the energy distribution components 12 and 22, the energy storage components 13 and 23, the energy management components 14 and 24, the energy metering components 15 and 25, the energy consumption component 26 and the central management component 27 may independently exist, or two or more of them may constitute a single component.

For example, the energy management component 14 or 24, the energy metering component 15 or 25 and the central management component 27 may exist as single components so as to be configured as a smart meter, an EMS and a home server, which perform their functions, respectively. Alternatively, the energy management component 14 or 24, the energy metering component 15 or 25, and the central management component 27 may constitute a single system.

When a function is performed, it may be sequentially performed in a plurality of components and/or communication units. For example, an energy management function may be sequentially performed in the energy management component, the energy metering component and the energy consumption component.

In the network system, a plurality of UANs 10 may communicate with a single HAN 20, and a single UAN 10 may communicate with a plurality of HANs 20. The component with a specific function, which constitutes the UAN and the HAN, may be configured as a plurality of components. For example, the energy generation component, the energy consumption component or the like may be configured as a plurality of components.

Figure 3:
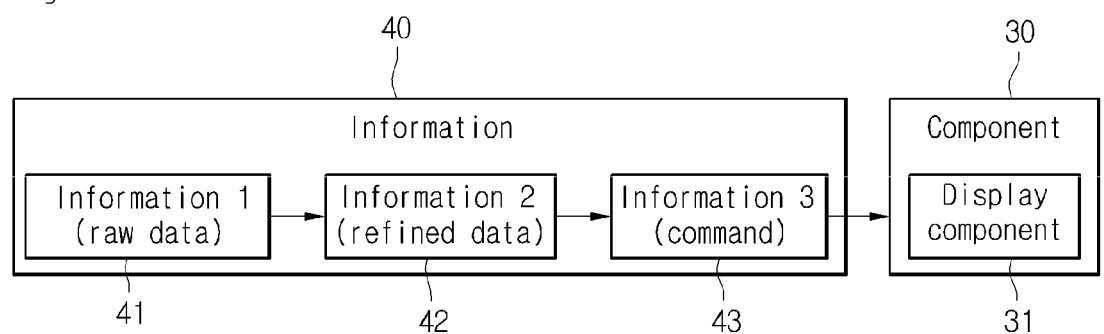
FIG. 3 is a block diagram illustrating an information transmission process on the network system of FIG. 1.

FIG. 3 is a block diagram illustrating an information transmission process on the network system of FIG. 1.

Referring to FIG. 3, in the network system, a specific component 30 may receive information related to energy (hereinafter, referred to as energy information 40) by means of a communication unit. The specific component 30 may further receive additional information (environment information, time information and the like) by means of the communication unit. In this instance, the information may be received from another component. That is, at least energy information is contained in the received information.

The specific component 30 may be a component that constitutes the UAN 10 or a component that constitutes the HAN 20.

As described above, the energy information 40 may be one of information related to electricity, water, gas and the like. Hereinafter, information related to electricity will be described as an example of the energy information, but information related to other energy sources may be identically applied.

For example, the kind of information related to the electricity may include time-based pricing, curtailment, grid emergency, grid reliability, energy increment, operation priority, and the like.

The information may be divided into scheduled information previously produced based on previous information, and real-time information changed in real time. The scheduled information and the real-time information may be divided by whether or not predict information after the current time (in the future). The energy information 40 may be transmitted and received as a true or false signal such as a Boolean signal on the network system, or may be transmitted/received as a real price. Alternatively, the energy information 40 may be transmitted and received by being divided into a plurality of levels.

The energy information 40 may be divided into time of use (TOU) information, critical peak pattern (CPP) information or real time pattern (RTP) information according to the change in the pattern of data with respect to time. According to the TOU information, a data is changed step by step depending on time. According to the CPP information, a data is changed step by step or in real time depending on time, and emphasis is displayed at a specific point of time. According to RTP information, a data is changed in real time depending on time.

In a case where the energy information is time-based pricing information as an example, the time-based pricing information is changed. The time-based pricing information may be transmitted and received as a true or false signal such as a Boolean signal on the network system, or may be transmitted/received as a real price. Alternatively, the time-based pricing information may be transmitted and received by being divided into a plurality of levels. In a case where the specific component 30 receives a true or false signal such as a Boolean signal, one signal may be recognized as an on-peak signal, and the other signal may be recognized as an off-peak signal.

Alternatively, the specific component 30 may recognize information on at least one drive, which contains the time-based information, and may recognize an on-peak or off-peak signal by comparing the value of the recognized information with the value of reference information. For example, in a case where the specific component 30 recognizes information divided into levels or real pricing information, it recognizes an on-peak or off-peak signals by comparing the value of the recognized information with the value of reference information.

In this case, the value of the information on drive may be at least one of time-based pricing, electric energy, the variation of time-based pricing, the variation of electric energy, the average of time-based pricing and the average of electric energy. The value of reference information may be at least one of an average, the average between maximum and minimum values of power information during a predetermined period of time and the reference variation of power information during the predetermined period of time (e.g., the slope of consumed electric energy per unit time).

The value of reference information may be determined in real time or may be previously determined. The value of reference information may be determined on the UAN or may be determined on the HAN (a customer's direct input or an input from the energy management component, the central management component or the like).

In a case where the specific component 30 (e.g., the energy consumption component) recognizes an on-peak signal (e.g., at a point of time of recognition), an output may be determined as zero (stop or maintenance of a stop state) or may be decreased. If necessary, the output may be restored or increased. The driving scheme of the specific component may be previously determined before the specific component is operated, or may be changed when the specific component recognizes an on-peak signal posterior to the start of operation.

Alternatively, in a case where the specific component 30 recognizes an on-peak signal (e.g., at a point of time of recognition), the output is maintained under an operable condition. In this case, the operable condition means that the value of the information on drive is less than a predetermined reference. The value of the information on drive may be time-based pricing, consumed electric energy, operation time, or the like. The predetermined reference may be a relative or absolute value.

The predetermined reference may be determined in real time or may be previously determined. The predetermined reference may be determined on the UAN or may be determined on the HAN (a customer's direct input or an input from the energy management component, the central management component or the like).

Alternatively, in a case where the specific component 30 recognizes an on-peak signal (e.g., at a point of time of recognition), the output may be increased. However, although the output is increased at the point of time when the specific component recognizes the on-peak signal, the total output amount of the specific component during the entire drive period may be decreased or maintained as compared with that when the specific component is operated at a normal output level. Alternatively, although the output is increased at the point of time when the specific component recognizes the on-peak signal, the total consumed power or total time-based pricing of the specific component during the entire operation period may be decreased as compared that when the specific component is operated at a normal output level.

In a case where the specific component 30 recognizes an off-peak signal, the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal, electricity may be stored.

The curtailment information is information related to a mode in which the specific component is stopped or a small amount of time-based pricing is taken. As an example, the curtailment information may be transmitted and received as a true or false signal such as a Boolean signal on the network system. If the specific component 30 recognizes curtailment information, the output may be determined as zero (stop or maintenance of a stop state) or may be decreased as described above.

The grid emergency information is information related to a power failure or the like. As an example, the grid emergency information may be transmitted and received as a true or false signal such as a Boolean signal on the network system. The information related to a power failure or the like has a relation with the reliability of a component using energy. In a case where the specific component 30 recognizes grid emergency information, it may be immediately shut down.

The grid reliability information is information related to the supply amount of electricity supplied or information related to the quality of electricity. The grid reliability information may be transmitted and received as a true or false signal such as a Boolean signal on the network system, or may be determined by a component (e.g., an electric home appliance) through the frequency of AC power supplied to the component. That is, if a frequency lower than the frequency of AC power supplied to the component is sensed, it may be determined that the amount of electricity supplied is small (information on the deficiency of the amount of electricity supplied). If a frequency higher than the frequency of AC power supplied to the component is sensed, it may be determined that the amount of electricity supplied is large (information on the excess of the amount of electricity supplied).

In a case where the specific component recognizes shortage of the amount of electricity or poor quality of electricity in the grid reliability information, an output may be determined as zero (stop or maintenance of a stop state) or may be decreased. If necessary, the output may be restored or increased. On the other hand, in a case where the specific component recognizes the information on the excess of the amount of electricity supplied, the output may be increased, or the operation may be converted from an off-state to an on-state.

The energy increment information is information related to a state that surplus electricity is generated because the amount of electricity used by a component is less than that of power generation. As an example, the energy increment information may be transmitted and received as a true or false signal such as a Boolean signal on the network system.

In a case where the specific component 30 recognizes energy increment information, the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Among the information related to energy, the on-peak information, the curtailment information and information on the deficiency of the amount of electricity supplied may be recognized as high-price information considered that energy cost is relatively expensive. On the other hand, among the information related to energy, the off-peak information, the energy increment information and the information on the excess of the amount of electricity supplied may be recognized as low-price information considered that energy cost is relatively cheap.

The information related to the fluctuation of the energy cost (high-price or low-price information) may be recognized as information for determining a power saving driving scheme of the specific component (e.g., the energy consumption component). That is, the information related to the fluctuation of the energy cost may be recognized by dividing a time slot (zone) based on energy cost or cost slot (zone) for determining a driving scheme of the specific component into at least two or more.

As an example, in a case where the information related to energy is recognized as a Boolean signal, the time slot (zone) based on energy cost or cost slot (zone) for determining a driving scheme of the specific component may be divided into two. In a case where the information related to energy is divided into a plurality of levels or recognized as real-time information, the time slot or cost slot may be divided into three or more.

Meanwhile, the information related to energy cost corresponding to at least time may be recognized as information for determining a power saving driving scheme of the specific component. That is, the information related to energy cost may be recognized by dividing a time slot (zone) or cost slot (zone) into at least two or more. As described above, the divided time slot or cost slot may be determined based on the kinds of the recognized information (the Boolean signal, the plurality of levels and the real-time information).

In other words, the information related to fluctuation of energy cost may be recognized by dividing a determination factor for driving the specific component into two or more, and functions on time and energy cost may be included in the determination factor.

In a case where the information related to energy cost is divided into two levels or more, the driving scheme of the specific component may be determined according to the information divided into levels. On the other hand, in a case where the recognized information related to energy cost is not divided based on a specific reference (e.g., real-time cost information), it is compared with predetermined information, and the driving scheme of the specific component may be determined based on the compared result.

Here, the predetermined information may be reference information (e.g. reference value) for dividing the information related to energy cost, and the compared result may be whether the information related to energy cost is not less or more than the reference value.

Specifically, each of the kinds of information related to energy may be divided into first information 41 that is raw information, second information 42 that is refined information, and third information 43 that is information for performing the function of the specific component. That is, the first information is a raw data, the second information is a refined data, and the third information is a command for performing the function of the specific component.

The information related to energy is included a signal, and the signal is transmitted. In this instance, one or more of the first to third information may be transmitted several times while the content of the information is not converted but only the signal including the information is converted. For example, as shown in FIG. 3, a component that receives a signal including the first information may convert only the signal and transmit a new signal including the first information to another component. Therefore, it is described in this embodiment that the conversion of signal is a different concept from the conversion of information. In this instance, it can be readily understood that when the first information is converted into the second information, the signal including the first information is also converted into the signal including the second information.

However, the third information may be transmitted several times in the state that the content of the third information is converted or in the state that only the signal including the third information is converted while the content of the third information is identically maintained. Specifically, in a case where the first information is raw information on time-based pricing, the second information may be refined information on the time-based pricing. The refined information on the time-based pricing is information in which the time-based pricing is divided into a plurality of levels or analysis information. The third information is a command generated based on the second information.

The specific component may generate, transmit or receive one or more of the first to third information. The first to third information are not necessarily transmitted or received in sequence. Only a plurality of pieces of third information without the first and second information may be transmitted in sequence or parallel. Alternatively, the first and third information may be transmitted or received together, the second and third information may be transmitted or received together, or the first and second information may be transmitted or received together.

As an example, in a case where the specific component receives the first information, it may transmit the second information or may transmit the second and third information. In a case where the specific information receives only the third information, it may generate and transmit new third information.

Meanwhile, in the relation between two pieces of information, one is a message and the other is a response for the message. Thus, each of the components that constitute the network system may transmit or receive a message. In a case where each of the components receives a message, it may respond to the message. Therefore, in the case of an individual component, the transmission of a message is a relative concept with the response for the message.

The message may include a data (first or second information) and/or a command (third information). The command (third information) may include a command for storing the data, a command for generating the data, a command for processing the data (including the generation of an additional data), a command for generating an additional command, a command for transmitting the additionally generated command, a command for transmitting a received command, and the like.

In this specification, the response for the received message means storage of the data, processing of the data (including generation of an additional data), generation of a new command, transmission of the newly generated command, simple transmission of a received command (including generation of a command for transmitting the received command to another component), operation, transmission of the stored information, transmission of an acknowledge message (acknowledge character or negative acknowledge character), or the like. For example, in a case where the message is first information, the specific component that receives the first information may generate second information by processing the first information, or may generate the second information and new third information, as a response for the message.

The specific component that receives the message may provide a response related to energy. Here, the term "response" may be understood as a concept including an operation through which the specific component can perform a function. As an example, the HAN 20 may perform an operation related to energy by receiving a message.

The response (operation) related to energy, provided by the specific component, will be described in detail. For example, the specific component may be an energy consumption component. The energy consumption component may be driven so that the energy cost when it is driven based on the recognition for energy information is reduced as compared with that when it is driven without the recognition for energy information.

The specific component may include a plurality of modes in which it is driven to perform its own function. The plurality of modes are a first mode and a second mode in which energy cost is relatively saved as compared with that in the first mode. The specific component may be driven in at least one of the first and second modes. Here, the first mode may be a general mode and the second mode may be a power saving mode. Alternatively, the first and second modes may all be power saving modes.

The general mode may be understood as a mode in which the function of the specific component is performed without recognition of energy information. On the other hand, the power saving mode may be understood as a mode in which the function of the specific component is performed based on the recognition of energy information so as to save energy cost. In a case where the first and second modes are power saving modes, the first mode may be specified as a driving scheme for saving energy cost and the second mode may be specified as a driving scheme in which the energy cost in the second mode is more saved than that in the first mode.

Meanwhile, in a case where the specific component (e.g., the energy consumption component) is driven, at least a portion is recognized in a driving scheme including at least drive time and course. In this case, an unrecognized portion may be generated so as to save energy cost, and a recognized portion may be converted into another scheme.

For example, at least a portion of the driving scheme may be recognized under the control of the energy management component, the control of the energy consumption component, or the like. In a case where a specific driving scheme is further required so as to save energy cost, an unrecognized portion of the driving scheme may be newly generated, and a recognized portion may be converted into another scheme so as to save energy.

It will be apparent that the process of generating the unrecognized portion may be omitted. In this case, the process of converting the recognized portion into another scheme. On the other hand, the process of converting the recognized portion into another scheme may be omitted. In this case, the process of newly generating the unrecognized portion may be performed.

The drive time may include a drive start time or drive end time. The course may include a drive period of the specific component and an output of the specific component.

The generated scheme or converted scheme may be a scheme recommended by the specific component so as to save energy cost. Here, the specific component may be an energy consumption component (control component) or the energy management component. As an example, in a case where the recognized scheme is a specific drive time, the specific drive time may be converted into another time so as to save energy cost, and a specific course may be generated.

On the other hand, in a case where the recognized scheme is a specific course, the specific course may be converted into another course so as to save energy cost, and a specific time may be generated. Under the control described above, a change in time or output may be made with respect to the output function of the specific component based on time.

The generated scheme or converted scheme may be performed within a set range. That is, in the process of recognizing at least a portion of the driving scheme, the generation or conversion of the driving scheme may be performed within a predetermined reference in which the recognized portion appears (e.g., restriction set by a user, constraint set under the control of the energy management component or energy consumption component, or the like). Therefore, in a case where the set range is out of the predetermined reference, it is restricted to generate the unrecognized portion or to convert the recognized portion into another scheme.

Another embodiment is proposed.

Cost information may further included in the recognized driving scheme. That is, in a case where the cost information is recognized, a portion related to the drive time or course may be generated. The generated driving scheme may be recommended. Meanwhile, a response of the specific component based on the information related to the fluctuation of the energy cost (high-price or low-price information), e.g., an output control for power saving driving, may be performed. An output decrease (including an output of zero) or output increase may be included in the output control.

It is as described above that the output is decreased or zero, maintained or increased based on the recognition for the information (on-peak or off-peak) related to energy cost. If high-price information is recognized, the output may be zero or decreased. Specifically, the output in the recognition of the high-price information may be decreased as compared with that in the recognition of low-price information. As described above, the decrease of the output may be previously determined before the specific component is operated, or may be changed when the high-price information is recognized posterior to the start of the operation of the specific component.

In a case where the output of the specific component is zero or decreased, the function to be performed by the specific component may be lost as compared with a normal case. Therefore, a response for restoring the lost function may be performed. As an example, after the output of the specific component is decreased, the specific component may be controlled so that the total operation time of the specific component is increased or so that the output is increased in at least a time period.

In other words, if specific reference information related to energy information is recognized in a period after the output of the specific component is controlled, the response for controlling the output may be released. Here, the term "period" may be divided based on a point of time when the high-price information is recognized. The total operation time may be understood as a time approaching a specific target in the process of performing the function of the specific component. As an example, in a case where the specific component is an electric appliance (washing machine, drying machine, cooking appliance or the like) intermittently driven (or driven in a specific course), the total operation time may be understood as a time until a corresponding course is completed.

On the other hand, in a case where the specific component is an electric appliance (refrigerator, water purifier, or the like) driven at normal times, the total operation time may be understood as a time approaching a target set for performing the function of the specific component. For example, the set target may be a target temperature, a target amount of ice produced, or a target amount of clean water in the refrigerator. The total operation time may be increased as compared with the operation time set before the output of the specific component is decreased. In a case where the output of the specific component is not decreased, the total operation time may be increased as compared with the operation time of the specific component. However, although the total operation time of the specific component is increased, the specific component is controlled so that the total energy cost generated through the drive of the specific component can be saved as compared with that when the output of the specific component is not decreased.

If the high-price information is recognized, the output of the specific component may be increased. However, although the output is increased at a point of time when the high-price information is recognized, the total output of the specific component during the entire driving period may be decreased or maintained as compared with that when the specific component is operated under a normal output. Alternatively, although the output is increased at a point of time when the high-price information is recognized, the total power consumption or total time-based pricing of the specific component during the entire driving period may be decreased as compared with that when the specific component is operated under the normal output.

If the low-price information is recognized, the output of the specific component may be increased. For example, in a case where the operation reservation of the specific component is set up, the driving of the specific component may be started before the setup time, or a component having a large output in a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case of a specific condition (additional condition) is generated based on the information related to the fluctuation of the energy cost (high-price or low-price information), the response of the specific component, e.g., the output control for power saving driving, may be limited. That is, the output of the specific component may be maintained. Here, the term "limitation" may be understood as the release of the output control performed or not performed.

The specific condition includes a case where influence on energy cost is minute even though the output control of the specific component is not performed or a case where it is necessary to prevent a function to be performed by the specific component from being degraded when the output of the specific component is controlled. Whether or not the influence on the energy cost is minute may be determined based on a predetermined reference (time-based pricing, power consumption or information on operation time). The predetermined reference may be a relative or absolute value.

The case where the function to be performed by the specific component is degraded may be considered as a case where the specific component is a defrosting heater, for example. In a case where it is controlled to decrease the output in a high-price time period and to increase the output in the low-price time period, the driving of the defrosting heater is more frequently performed than that during a normal time (setup period). In this case, the temperature of a storage room in the refrigerator is increased, and thus, the control of the output can be limited.

Figure 4:
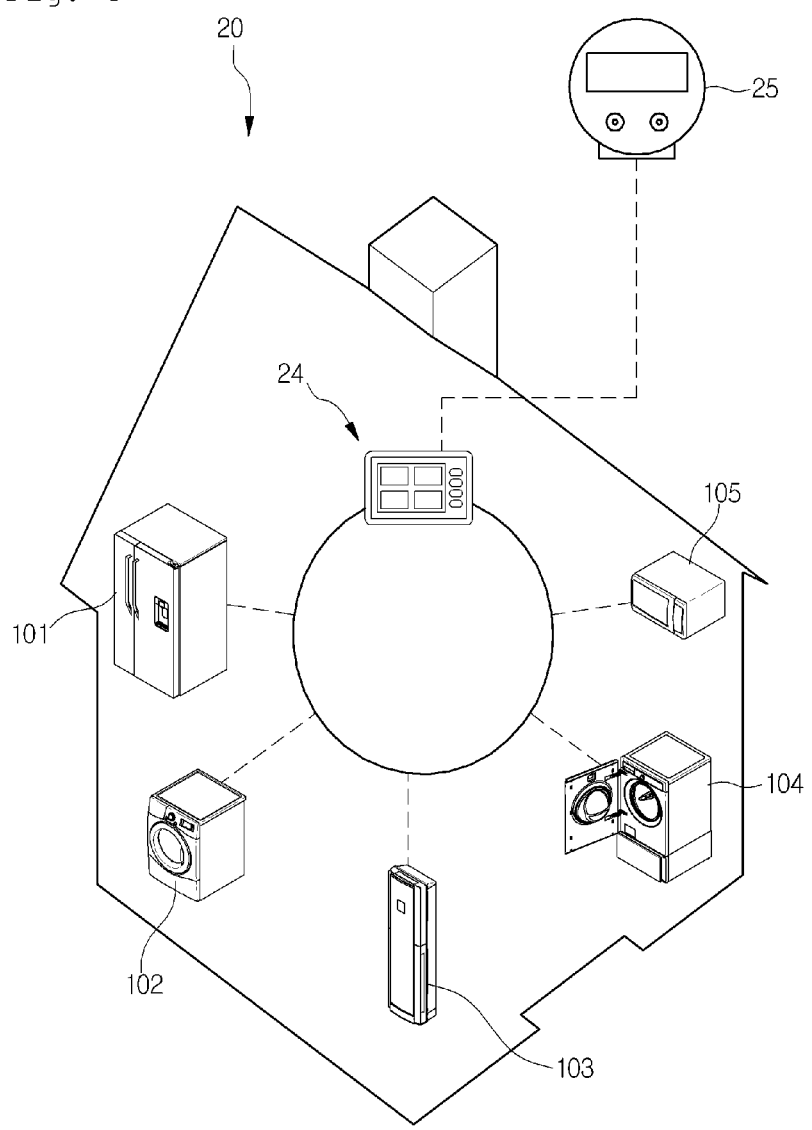
FIG. 4 is a schematic view illustrating a HAN according to an embodiment.

FIG. 4 is a schematic view illustrating a HAN according to an embodiment.

Referring to FIG. 4, a HAN 20 according to the current embodiment includes: an energy metering component 25 such as a smart meter for metering, in real time, power and/or time-based pricing supplied from a UAN 10 to each of houses; and an energy management component 24 connecting to the energy metering component 25 and an electric appliance, and controlling operations thereof. As described above, the energy management component 24 may be separated from the electric appliance, or be embedded therein.

For example, an electricity cost at each residential customer may be charged as a cost per time. An electricity cost per time may be high in a time period when a power consumption amount quickly increases, and an electricity cost per time may be low at midnight when a power consumption amount is small.

The energy management component 24 may connect through an in-house network to an electrical appliance as an energy consumption component 26, that is, to one of a refrigerator 101, a washing machine 102, an air conditioner 103, a dryer 104, and a cooking appliance 105 so as to perform two-way communication. In-house communication may be performed using a wireless method such as ZigBee or WiFi, or a wire method such as power line communication (PLC), and an electric home appliance may connect to other electric home appliances so as to communicate therewith.

Figure 5:
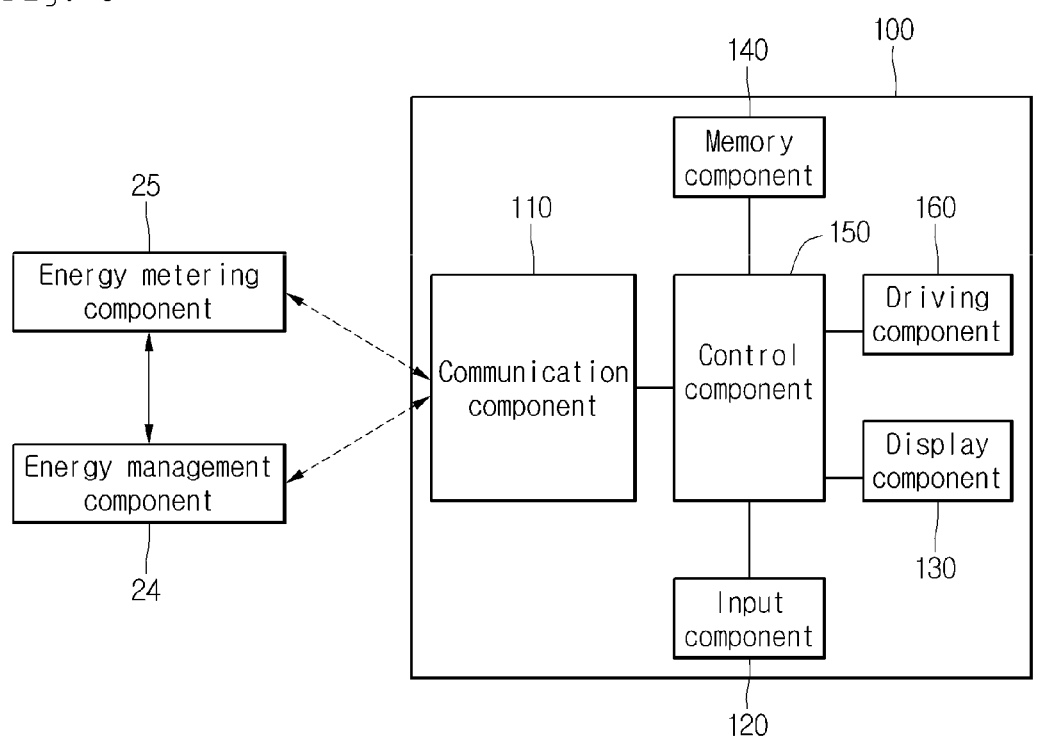
FIG. 5 is a block diagram illustrating a configuration of an electric appliance according to an embodiment.

FIG. 5 is a block diagram illustrating a configuration of an electric appliance according to an embodiment.

Referring to FIG. 5, an electric appliance 100 as an energy consumption component according to the current embodiment includes a communication component 110. The electric appliance 100 may include one of a refrigerator 101, a washing machine 102, an air conditioner 103, a dryer 104, and a cooking appliance 105.

The communication component 110 may communicate with at least one of an energy metering component 25 that recognizes energy information or additional information, and an energy management component 24 that manages (controls) driving of the electric appliance 100 according to the energy information or the additional information. The energy metering component 25 and the energy management component 24 may connect to each other so as to communicate with each other. The communication component 110 may be embedded in the electric appliance 100, or be removably coupled thereto.

The electric appliance 100 includes: an input component 120 for inputting a predetermined command; a display component 130 for displaying driving information of the electric appliance 100, or recommended information related to driving (course) of the electric appliance 100; a memory component 140 for storing specific course information; a driving component 160 that is driven to perform a course of the electric appliance 100; and a control component 150 for controlling the input component 120, the display component 130, the memory component 140, and the driving component 160.

The input component 120 includes: a power input part for turning the electric appliance 100 on/off; a course set part for selecting one of at least two recommended courses; and a start input part for inputting a command to drive the electric appliance 100.

Further, the input component 120 may include: a consumable input part for inputting information about a consumable to be processed by the electric appliance 100 (hereinafter, the information is referred to as consumable information); and a course recommendation selection part whereby a specific course is recommended based on driving information of the electric appliance 100 or information received from the outside.

The consumable may be an object to be managed or processed by the electric appliance 100. For example, when the electric appliance 100 is a cooking appliance, the consumable may be a food. When the electric appliance 100 is a washing machine or a dryer, the consumable may be an item of clothing. When the electric appliance 100 is a refrigerator, the consumable may also be a food.

The consumable information includes information about the consumable, or information for processing (managing) the consumable. For example, when the consumable is a cooking target, the information about the consumable may be the type or amount (quantity) of the cooking target, and the information for processing the consumable may be the type of a function for cooking the cooking target.

When the consumable information is recognized, a plurality of driving courses are recommended based on the consumable information, and be displayed on the display component 130. The memory component 140 may store specific course information that may include "my-course information" as a frequently used function.

The driving component 160 generates driving force to perform functions of the electric appliance 100. For example, the driving component 160 may include a compressor, a motor, or a heater.

Figure 6:
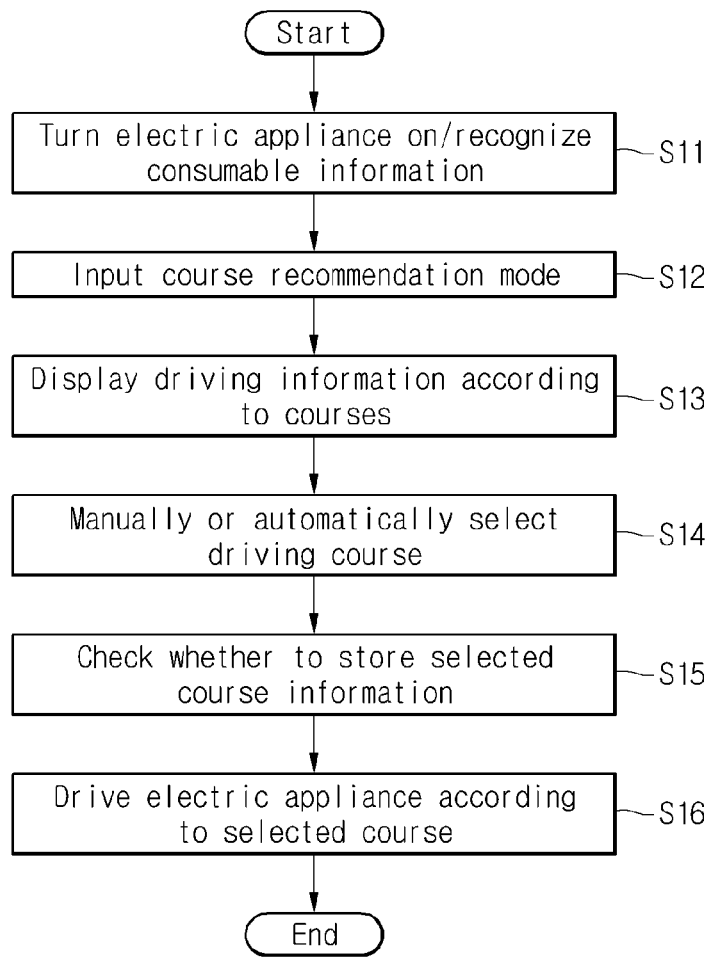
FIG. 6 is a flowchart illustrating a method of controlling an electric appliance according to an embodiment.

FIG. 6 is a flowchart illustrating a method of controlling an electric appliance according to an embodiment. Referring to FIG. 6, a method of controlling an electric appliance will now be described according to the current embodiment. In the current embodiment, a cooking appliance will be exemplified as the electric appliance. However, the electric appliance is not limited thereto.

In operation S11, the electric appliance is turned on, and consumable information for a cooking target may be recognized. For example, the consumable information may include information about the consumable, which denotes "a turkey", and information for processing the consumable, which denotes "a baking function". Methods of recognizing the consumable information may include a manual input method by a user, and an automatic recognition method using a sensor. The sensor includes an image device or a weight sensing device.

In operation S12, a "course recommendation mode" may be input through the input component 120. The term "mode" may include a specific component constituting the electric appliance 100, a specific driving course, or a specific process with respect to functions of the electric appliance 100.

The "course recommendation mode" recommends at least one course for driving the electric appliance 100, based on the recognized consumable information. That is, the "course recommendation mode" may be referred to as an auto cook mode that recommends and drives a cooking course preset for improving use convenience. In the course recommendation mode, a plurality of drivable courses may be displayed, and one of the drivable courses may be selected.

When the course recommendation mode is input, driving information according to courses may be displayed on the display component 130 in operation S13. The cooking appliance may include a plurality of heat sources (heaters) as driving components for cooking the consumable. The heat sources may output the same power or different powers. The courses may be varied according to combinations of the driving components (heat sources), power thereof, or the number thereof.

Each of the courses may include a plurality of different stages. For example, a first heat source and a second heat source may be driven for 5 minutes in a first stage, and a second heat source and a third heat source may be driven for 7 minutes in a second stage. One of the courses may include three or fours stages, if necessary.

As such, courses for cooking the consumable may be displayed according to the types of heat sources or times for driving heat sources. That is, when a cooking function ("the baking function for the turkey" is recognized, a plurality of courses for performing the cooking function may be displayed.

One of the displayed courses may be manually or automatically selected in operation S14. That is, a user may select one of the displayed courses by using the input component 120, or at least one of the displayed courses may be automatically selected.

Criteria for the automatic selection may be preset. For example, the criteria may be order information of courses displayed on the display component 130, that is, the uppermost one of courses displayed on the display component 130 may be automatically selected. Alternatively, a course requiring the shortest cooking time or the lowest energy cost may be automatically selected. However, the criteria for the automatic selection are not particularly limited.

Information about the manually or automatically selected course may be stored in the memory component 140 in operation S15. That is, a user may check a plurality of courses in order to perform a specific cooking function, and register or store the courses as frequently used courses, based on determination factors defining the courses. The determination factors are information related to a consumable or driving of an electric appliance, and may include a cooking performance (performance factor) denoting a processed result of the consumable, a driving time of a driving component, or an energy cost. In operation S16, the electric appliance 100 may be driven according to the manually or automatically selected course.

FIG. 7 is a view illustrating a display component of an electric appliance according to a first embodiment. Referring to FIG. 7, driving information as in operation S13 of FIG. 6 is displayed on the display component 130.

Particularly, course information items are displayed based on recognized consumable information. The course information items may be classified according to factors related to driving of the cooking appliance.

For example, a first course has a cooking time of 30 minutes, a cooking performance of B+ according to a predetermined criterion, a cost of 900 or 750 wons according to predetermined pricing criteria, and a power consumption of 2 kWh. The cooking time of 30 minutes may be total time of one or more stages according to the types, power, or number of heat sources to be driven.

The cooking performance may be a value corresponding to a cooked result of a consumable. The cooking performance may be displayed using a method of expressing predetermined levels. For example, the cooking performance may be displayed as a predetermined character as illustrated in FIG. 7, a predetermined score, or a differentiated graph.

A cost required by the first course may include at least one of a first cost and a second cost according to the charging criteria. The first cost is converted from a time-varying cost, based on a present time. The second cost may be converted from a time-invariant cost. Thus, the second cost may be determined according to the power consumption of each course.

That is, the first cost may be determined based on a floating payment system in which a cost is varied according to received energy information, and the second cost may be determined based on a fixed payment system in which a cost is fixed regardless of energy information.

When the energy information is transmitted to the electric appliance 100, and the floating payment system is used based on the energy information, the first cost may be activated, and the second cost may be inactivated. On the contrary, when the fixed payment system is used, the second cost may be activated, and the first cost may be inactivated.

Although the first and second costs are simultaneously displayed in FIG. 7, one of the first and second costs may be displayed according to a used payment system. The display component 130 may display power consumption required when the electric appliance 100 is driven in the first course.

Further, the display component 130 may display other courses than the first course. The other courses may include a second course, a third course, and a fourth course, according to factors for determining a method of driving the cooking appliance (that is, according to cooking time, cooking performance, cost, and power consumption).

The courses may be sequentially sorted according to a predetermined criterion. The courses may be sorted from short to long cooking time as illustrated in FIG. 7, from high to low cooking performance, from low to high cost, or from small to large power consumption.

When the course information items of the cooking appliance are displayed, one of the first to fourth courses may be selected to be performed. As in the previous embodiment, a user may manually select one of the first to fourth courses after checking the displayed course information items.

Alternatively, the electric appliance 100 may automatically select an optimal course from the first to fourth courses. For example, unless a user selects a course within a set time after the course information items are displayed on the display component 130, a course to be performed may be automatically selected. For example, a course having the lowest cost or the shortest process time, or the uppermost course may be automatically selected. The uppermost course may be optimized according to a set criterion such as energy cost or time.

One of the displayed first to fourth courses may be recommended. For example, a display region of the recommended course may blink or illuminate (activation). The other courses may be inactivated. A course located in the uppermost position according to a sorting criterion may be recommended, and be selected by a user.

When a course to be performed is selected, the selected course may be saved as "my-course information" on the display component 130. After a specific course is saved as the "my-course information", when a user performs the same cooking function corresponding to the specific course later, the user can conveniently select the specific course.

FIG. 8 is a view illustrating a display component of an electric appliance according to a second embodiment. Referring to FIG. 8, information recommended to avoid a high price period is displayed, based on received energy information. The recommended information may be displayed when a course recommendation mode is input as in operation S12 of FIG. 6.

Particularly, a plurality of courses classified according to determination factors as described above are displayed on the display component 130. For example, the courses may be sorted according to cooking time as a determination factor.

When high price information is transmitted to the cooking appliance, a driving time of the cooking appliance may be recommended. For example, when a present time of 12:00 when a user intends to drive the cooking appliance is within the high price period, a delayed start time for avoiding the high price period may be recommended.

Referring to FIG. 8, first to fourth courses may be recommended, which are performed at specific times after 12:00. The display component 130 may display costs saved when the recommended first to fourth courses are selected instead of a course corresponding to the present time.

A user may select a specific course, based on displayed course information items. When there is no course that the user desires, for example, when cooking is needed at present, the course recommendation mode may be canceled, and a general mode may be performed. The general mode is contrasted with the course recommendation mode. In the general mode, a user may directly set and perform a desired course, regardless of energy information.

As such, energy cost can be decreased by using a specific driving time recommended to avoid a high price period.

Another embodiment is proposed.

An electric appliance according to the current embodiment may be a washing machine. A consumable processed by the washing machine may be an item of clothing, and a driving component may be a motor. The motor may rotate a drum for accommodating clothing. Determination factors as described above may include a washing performance, denoting a processed result of clothing, a driving time, or an energy cost.

A display component may display courses classified according to the determination factors. One of the classified courses may be selected to drive the washing machine. The selected course may be stored in a memory component.

Another embodiment is proposed.

An electric appliance according to the current embodiment may be a dryer. A consumable processed by the dryer may be an item of clothing, and a driving component may be a heat source (heater). The heater may be a component for removing moisture from clothing. Determination factors as described above may include a drying performance, denoting a processed result of clothing, a driving time, or an energy cost.

A display component may display courses classified according to the determination factors. One of the classified courses may be selected to drive the dryer. The selected course may be stored in a memory component.

Another embodiment is proposed.

An electric appliance according to the current embodiment may be a refrigerator. A consumable managed by the refrigerator may be a food, and a driving component may be a heat source (heater) or a compressor. The heater may be a component for removing frost from an evaporator, or dew from the refrigerator. The compressor may be a component for producing cold air. Determination factors as described above may include a storing performance, denoting a managed result of food, a driving time of the driving component, or an energy cost.

A display component may display courses classified according to the determination factors. One of the classified courses may be selected to drive the refrigerator. The selected course may be stored in a memory component.

According to the embodiments, an energy source is efficiently produced, used, distributed, and stored, so that the energy source can be effectively managed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A network system supplied with energy from an energy generation component, comprising an energy consumption component consuming the energy generated from the energy generation component, and driving a driving component for processing or managing an object to be managed or processed by the energy consumption component, wherein the energy consumption component is provided with one or more operation courses classified according to a determination factor related to the object, the determination factor comprises a performance factor denoting a processed or managed result of the object, and one or more of the operation courses are displayed at a display to recommend the one or more of operation courses when the energy consumption component recognizes information about the object, wherein, when it is determined that one of the one or more of operation courses displayed at the display is selected, the energy consumption component operates the selected one of the one or more of operation courses, and wherein, when more than one of the operation courses are displayed at the display, the operation courses are sequentially sorted according to one of the performance factor, a driving time of the driving component, and electricity cost information.

2. The network system according to claim 1, wherein the course comprises one or more stages classified according to the types, power, or number of driving components.

3. The network system according to claim 2, wherein the driving time is total time taken when performing all of the stages.

4. The network system according to claim 1, wherein the electricity cost information comprises:
- at least one of a first cost information determined based on energy information received by the energy consumption component; and
- a second cost information determined regardless of the energy information.

5. The network system according to claim 4, wherein the first cost information and the second cost information are displayed to be compared with each other.

6. The network system according to claim 1, further comprising a memory component that stores the selected one of the one or more of operation courses as my-course information.

7. The network system according to claim 1, wherein the energy consumption component comprises a cooking appliance, and the driving component comprises at least one heat source for cooking the object.

8. The network system according to claim 1, wherein the object comprises one of a cooking target, an item of clothing, and a food.

9. A method of controlling a network system, comprising:
- recognizing information about an object that is managed or processed by an electric appliance;
- inputting a first mode of an operation mode of the electric appliance;
- determining operation courses based on the recognized information about the object;
- displaying the operation courses to recommend the determined operation courses;
- determining whether one of the operation courses is selected; and
- driving a driving component of the electric appliance in the selected operation courses,
- wherein the operation courses are sequentially sorted at a display according to one of a performance factor denoting a processed or managed result of the object, a driving time of the driving component, and electricity cost information.

10. The method according to claim 9, wherein the information about the object is recognized when a user manually inputs the information, or is automatically recognized using at least one of an image device and a weight sensing device.

11. The method according to claim 9, further comprising storing information about the selected course in a memory component,
wherein the information about the selected course comprises a determination factor related to a driving performance denoting a processed result of the object, a driving time, or an energy cost.

* * * * *